March 9, 1943.     R. CARPENTER     2,313,322
STEAM JOINT
Filed Jan. 8, 1942
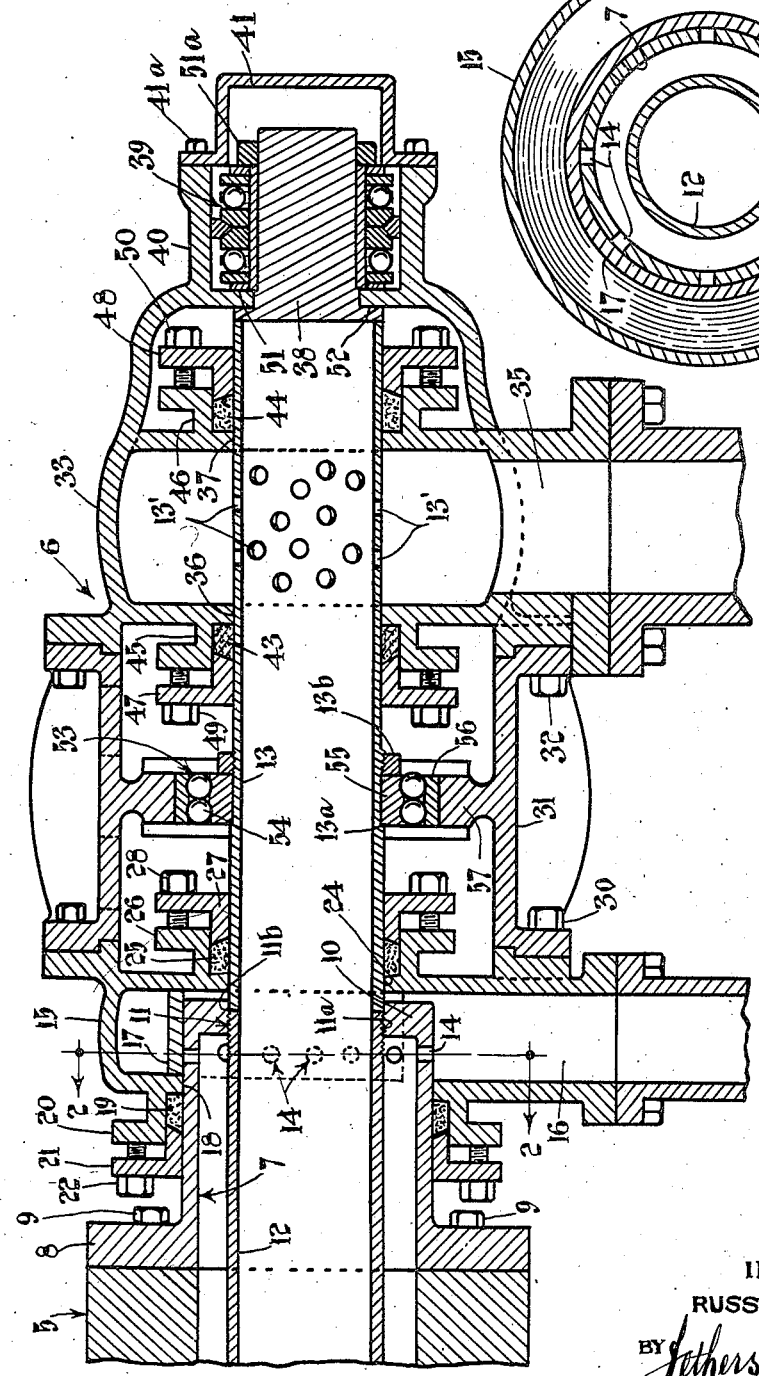
INVENTOR
RUSSELL CARPENTER
BY Fetherstonhaugh & Co.
ATTORNEYS Patented Mar. 9, 1943

2,313,322

UNITED STATES PATENT OFFICE 2,313,322

STEAM JOINT

Russell Carpenter, Three Rivers, Quebec, Canada

Application January 8, 1942, Serial No. 426,061
In Canada December 13, 1941

3 Claims. (Cl. 285—10)

This invention relates to steam joints used in connection with steam heated cylinders employed in paper making and in other industries. The principal object is the provision of an improved steam joint assembly which reduces loss of steam due to leakage and which imposes a substantially reduced dragging or braking effect on the cylinder as compared with the steam joints now in use.

Other objects, advantages and characteristic features of the invention will be more readily understood from the following detailed description taken in connection with the accompanying drawing, in which—

Fig. 1 is a longitudinal sectional view of my improved steam joint assembly and shows the manner in which said assembly is attached to and supported by the journal of a steam heated cylinder.

Fig. 2 is a transverse sectional view taken along the line 2—2 of Fig. 1.

Referring more particularly to the drawing, 5 designates the journal of a steam heated cylinder and 6 my improved steam joint assembly which is attached to and supported by said journal.

As here shown, the assembly 6 includes a tubular condensate receiving chamber 7 fixed to rotate with the journal 5 by means of flange 8 and stud bolts 9. The journal end of chamber 7 is open so that the condensate will pass freely into this chamber from the journal 5 to which the condensate is delivered by scoops or other conventional condensate removing means arranged within the cylinder proper. The opposite end of chamber 7 is partially closed by an end wall 10 provided with a central aperture 11. A part of the aperture 11 is screw-threaded as indicated at 11a to receive therein the threaded outer end of a pipe section 12 which extends inwardly through the journal 5 to the interior of the steam heated cylinder. Pipe section 12 is aligned with a pipe section 13, the adjacent end of which is welded in place within the smooth portion 11b of aperture 11. The pipe sections 12 and 13 conjointly provide a steam supply pipe through which steam is passed through the journal 5 to the interior of the steam heated cylinder, from whence the condensate is returned through the journal 5 to the condensate receiving chamber 7.

The chamber 7 is provided, adjacent the end wall 10, with a multiplicity of condensate outlet openings 14 through which the condensate passes into a stationary annular casing 15 provided with a main condensate outlet 16. The portion of chamber 7 which extends into casing 15 rotates in contact with a curved plate 17 which prevents escape of steam and condensate through the openings 14 until the latter are rotated to or approximately to a position opposite the condensate outlet 16.

As shown in Fig. 2, the plate 17 extends around practically three-fourths the circumference of the chamber 7. The cylinder side of casing 15 is provided with an opening 18 for the passage of chamber 7 and leakage through this opening is prevented by packing 19 which is contained in the stuffing box extension 20 of casing 15 and is compressed by a gland 21 which is fastened to the stuffing box 20 by stud bolts 22. The side of casing 15 remote from journal 5 is provided with an opening 24 for the passage of pipe section 13 and leakage through this opening is prevented by packing 25 which is arranged in a second stuffing box extension 26 of casing 15, said packing being compressed by a gland 27 fastened to stuffing box 26 by stud bolts 28. Casing 15 is fastened by stud bolts 30 to one side of a bearing casting 31. The opposite side of casting 31 is fastened by stud bolts 32 to a stationary steam inlet casing 33 provided with a main steam inlet 35. Opposite walls of the casing 33 are provided with openings 36 and 37 through which the pipe section 13 extends, the outer end of said pipe section being closed and provided with a journal extension 38 which is rotatably supported by means of a double thrust anti-friction bearing 39 contained within a bearing housing 40 which is formed integral with casing 33 and is closed at its outer end by a removable cap member 41 secured in place by stud bolts 41a.

Leakage through the openings 36 and 37 of casing 33 is prevented by suitable packing 43 and 44 which is arranged in the stuffing box extensions 45 and 46 of said casing, said packing being placed under compression by the gland members 47 and 48 which are fastened to the stuffing boxes 45 and 46 by stud bolts 49 and 50.

The bearing housing 40 of casing 33 is provided with an inner end wall 51 which fits between the anti-friction bearing 39 and a shoulder 52 provided at the inner end of the journal 38. The bearing 39 is clamped against the wall 51 by a clamping nut 51a which is threaded onto the outer end of journal 38.

A further anti-friction bearing 53 is provided between the casting 31 and the portion of pipe section 13 which passes through said casting. The bearing 53 comprises anti-friction balls 54 arranged between an inner race 55 encircling the pipe section 13 and an outer race 56 which is arranged within an inwardly directed annular rib extension 57 of casting 31. The inner race 55 is clamped in place between a shoulder 13a of pipe section 13 and a clamping nut 13b. A slight clearance is reserved between the rib extension 57 so that the bearing 53, as a whole, is free to move relatively to said rib extension in response to expansion and contraction of pipe section 13.

The portion of pipe section 13 which lies between openings 36 and 37 of steam supply casing 33 is provided with a multiplicity of relatively small steam inlet openings 13' through which steam passes from the casing 33 into pipe section 13 and from thence through pipe section 12 to the interior of the steam heated cylinder.

From the foregoing description it will be apparent that the condensate receiving chamber 7 and the pipe sections 12 and 13 rotate with the journal 5 and relatively to casing 15, casting 31 and casing 33. The steam supplied to casing 33 through inlet 35 passes into the rotating pipe section 13 through the steam inlet openings 13a thereof and is thus delivered through pipe sections 13 and 12 to the interior of the steam heated cylinder. The condensate accumulating within the interior of said cylinder is picked up by scoops or other conventional condensate removing means and delivered to the inner end of journal 5 so that it flows outwardly through this journal to the rotating condensate receiving chamber 7 and escapes through the outlets 14 as the latter are rotated to a position below the ends of the plate 17 arranged in the condensate outlet casing 15. The bearings 39 and 53 serve as supporting and aligning bearings which prevent sagging of the pipe section 13 and holds it in true alignment with the pipe section 12. The packing contained within the packing boxes 20, 26, 43 and 44 may be compressed sufficiently to prevent leakage without offering excessive drag or brake resistance to the rotation of the condensate receiving chamber 7 and the pipe sections 12 and 13 which are fixed to rotate with the journal 5. In practice it has been found that the resistance which the steam joint assembly described herein opposses to rotation of the steam heated cylinder to which it is connected is substantially less than that imposed by the ball and socket and various other types of steam joints now in use.

Another advantage of the assembly described herein is that leakage of steam is reduced to a minimum as compared with the leakage characteristic of other types of steam joints.

Having thus described what I now consider to be the preferred embodiment of this invention it will be understood that various modifications may be resorted to within the scope and spirit of the appended claims.

Having thus described my invention, what I claim is:

1. A steam joint assembly adapted to be attached to a hollow rotary journal of a steam heated cylinder, said assembly comprising a pair of spaced apart, stationary casings, a rotary condensate receiving chamber communicating with one of said casings, a rotary steam supply pipe passing through both of said casings and through said condensate receiving chamber, said pipe communicating with the other of said casings to receive steam therefrom, means for attaching said assembly to said journal whereby rotation of the journal results in relative rotation between the condensate receiving chamber and the steam supply pipe on the one hand and the aforesaid casings on the other hand and a bearing casting interposed between and supported by said casings, said bearing casting serving to support the portion of the steam supply pipe lying between said casings.

2. A steam joint assembly adapted to be attached to a hollow rotary journal of a steam heated cylinder, said assembly comprising a tubular condensate receiving chamber having one end fastened to said journal so that the interior of said chamber is placed in communication with the interior of the cylinder through said journal, said casing being secured to said journal so as to rotate therewith, a pipe extending through an opening at the opposite end of said chamber and through said journal, said pipe being fixed to rotate with said chamber and said journal, a stationary casing surrounding a portion of said chamber and an adjacent portion of said pipe, the portion of the chamber surrounded by said casing being provided with condensate outlet openings placing the interior of said chamber in communication with said casing, packing interposed between said casing and said chamber and between said casing and the portion of the pipe surrounded thereby, a second stationary casing through which said pipe extends, said second casing being spaced from said first mentioned casing in the longitudinal direction of the pipe, the portion of the pipe passing through said second casing being provided with steam inlet openings, packing arranged to seal the openings of the second casing through which said pipe extends, means for supplying steam to said second casing, and a casting arranged between and supported by said casings and an anti-friction bearing interposed between said casting and the portion of the pipe passing therethrough.

3. A steam joint assembly comprising a pair of stationary casings fastened to opposite sides of an interposed bearing casting, a steam supply pipe passing through both of said casings and through said bearing casting, pipe supporting bearing means interposed between said bearing casing and the portion of the pipe passing therethrough, one end of said pipe being closed and journalled in a bearing housing supported by one of said casings, a portion of the pipe passing through one of said casings being provided with apertures whereby the interior of said pipe is placed in communication with the interior of said casing to receive steam therethrough.

RUSSELL CARPENTER.